H. E. WARREN.
SELF STARTING SYNCHRONOUS MOTOR.
APPLICATION FILED SEPT. 19, 1918.

1,283,435.  Patented Oct. 29, 1918.

Inventor:
Henry E. Warren
by Jas. H. Churchill
atty.

UNITED STATES PATENT OFFICE.

HENRY E. WARREN, OF ASHLAND, MASSACHUSETTS, ASSIGNOR TO WARREN CLOCK COMPANY, OF ASHLAND, MASSACHUSETTS, A CORPORATION OF MAINE.

SELF-STARTING SYNCHRONOUS MOTOR.

1,283,435.   Specification of Letters Patent.   Patented Oct. 29, 1918.

Application filed September 19, 1918. Serial No. 254,701.

*To all whom it may concern:*

Be it known that I, HENRY E. WARREN, a citizen of the United States, residing in Ashland, in the county of Middlesex and State of Massachusetts, have invented an Improvement in Self-Starting Synchronous Motors, of which the following description, in connection with the accompanying drawings, is a specification, like characters on the drawings representing like parts.

This invention relates to a synchronous motor for alternating current and has for its object to provide a self-starting motor of the character described, which is capable of being produced and operated at a minimum expense.

The particular features of this invention will be pointed out in the claims at the end of this specification.

Figure 1:
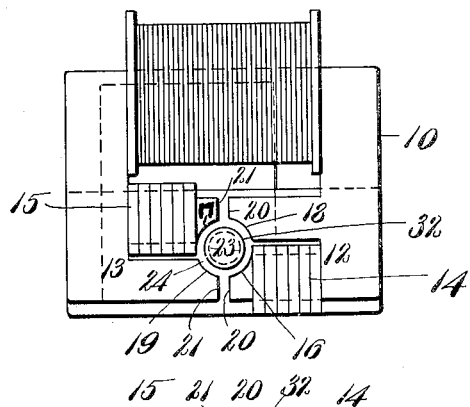

Figure 1 is a plan view of one construction of self-starting synchronous motor embodying this invention.

Figure 2:
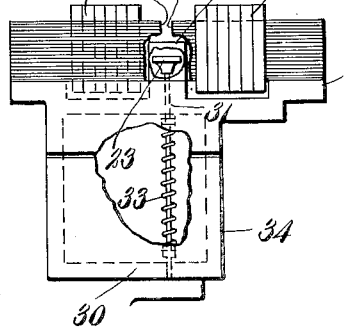

Fig. 2, a front elevation of the motor shown in Fig. 1, and

Figure 3:
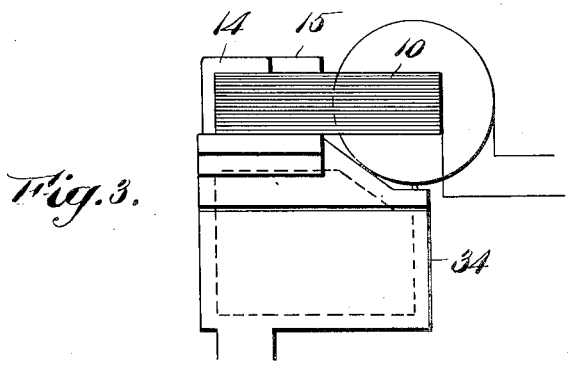

Fig. 3, a side elevation of the motor shown in Fig. 1.

In the present instance, the invention is shown as embodied in a preferred form of self-starting synchronous motor for alternating current, which comprises essentially a bipolar field magnet 10 provided with opposite poles 12, 13, which are divided so as to produce a rotating magnetic field by means of the shading coils 14, 15, which coils cause the magnetism in the curved pole faces 16, 17, to lag somewhat behind the magnetism in the curved pole faces, 18, 19. The poles 12, 13, are constructed and arranged so that the opposing ends 20, 21, of the said poles are in substantially close proximity to each other, whereby the said poles are separated by substantially narrow spaces and the rotor is substantially encircled by the curved pole faces.

In the space inclosed by the curved pole faces 16, 17, 18, 19, wherein the magnetic field revolves, there is a rotor, preferably made as a circular disk 23 of hardened steel, which is of such diameter as to leave a relatively large air gap 24 between its circumference and the curved faces of the poles 12, 13, whereby stray lines of force which bridge across the gap between the pole ends 20 and 21 do not extend into and interfere with that portion of the rotating magnetic field which affects the rotor 23, which stray lines have a tendency to set up local poles in the rotor distinct from the main poles produced by the pure rotating field. The wide air gap around the rotor, however, is not the sole factor controlling the tendency to set up local poles but is also due in part to the narrow air gap between the opposing poles of the field 20 and 21, and I have found from experiment that either one of these variables may be considerably altered and the effect neutralized by a corresponding modification of the other variable in the proper direction. That is to say, the gap between 20 and 21 may be increased if the air gap around the rotor is also fairly wide or vice versa.

The hardened steel disk 23 is for the best results provided with a circumference which is free or substantially free from interruptions and therefore is free or substantially free from geographical poles.

The hardened steel disk 23 on the other hand, has induced within it by the rotating magnetic field, poles which are located at the opposite ends of any diameter through the said disk and are capable of shifting through the mass of hardened steel of which the disk is composed, but which have a very strong tendency to remain in fixed position in said mass under the influence of the rotating magnetic field.

The high starting torque and strong tendency to run at synchronous speed are due in large measure to the high remanence value of the hardened steel in the rotor, and I find that the remanence value of soft steel is not sufficient to compel a smooth disk to run synchronously, for the reason that the magnetic poles in soft steel will revolve easily about the axis of the rotor, which of course is a condition that absolutely prevents synchronous running.

I am aware that synchronous motors have been made heretofore in which remanence or the tendency of magnetism to persist in magnetizable material, has served as a factor in holding a rotor in synchronism in an alternating field, but all such motors have utilized rotors which are geometrically polarized, so that the magnetic reluctance or resistance to the passage of magnetic lines has been much greater through certain diameters of the rotor than through other diameters. By reason of this fact, it is very difficult or almost impossible for the magnetic poles to rotate around the axis of the rotor entirely apart from the remanence effect, and consequently such rotors may be and usually are made from soft steel having low remanence value. The real factor which holds these rotors in synchronism is not the remanence of the steel but the great variations in reluctance through different diameters. However in consequence of the variations in reluctance through different diameters, rotors with marked geometrical poles have a strong tendency to remain at rest and can only be started even in a rotating field by some special means.

In the case of the motor embodying this invention, the reluctance which the hardened steel disk 23 offers to the passage of the magnetic lines of force, is the same in all positions of the said disk, and therefore the rotor has no dead positions where the reluctance is less than in any other position, consequently the rotor has a positive starting torque, and while the rotor is coming up to synchronism, the magnetic polarization of the rotor is able to shift around its axis, although with some difficulty, until synchronous speed is reached, whereupon the shifting of the magnetic polarization in the rotor ceases, and the latter then acts as a definitely polarized mass.

It will therefore be seen, that in the rotor herein shown and described, there is a substantially uniform reluctance to the passage of magnetic lines of force in all positions of the rotor, consequently when the rotor is at rest in any position, it offers practically the same resistance or reluctance to the passage of magnetic lines from one pole as 12 to the other pole as 13 of the magnet 10, and therefore it possesses self-starting characteristics, because the magnetic field surrounding the rotor is rotating and drags the rotor around with it.

In practice of my invention I employ a rotor of magnetizable material which is free or substantially free from geographical poles in a rotating magnetic field which is substantially free from stray lines of flux, but I do not wish to be limited to the use of a circular disk, as a rotor of magnetizable material which is slightly polarized geometrically can be used to run synchronously in a rotating magnetic field such as I have described, provided its tendency to remain at rest (due in part to the moment causing the rotor to seek a position where the variable angular reluctance across some diameter with respect to the poles is least, and in part to the moment of inertia), is less than the tendency to rotate due to remanent magnetism.

I am aware, however, that there are certain definite limits in the size and proportion of parts to which a rotor must conform, whether geographically non-polar or but slightly so, in order to have synchronous running characteristics in accordance with my invention. For instance, a rotor of given diameter in a given field and a given quality of steel must have an axial thickness whose ratio to the thickness of the pole faces lies between certain definite values, or to cite a numerical example, if the diameter of the pole faces of the field magnet is $\tfrac{5}{8}''$ and the air-gap across the opposing poles is $\tfrac{1}{4}''$ and the width of pole face is $\tfrac{3}{8}''$, the copper shading coils $\tfrac{3}{32}''$ thick, $\tfrac{3}{8}''$ wide and strength of field provided by 4800 turns of #36 copper wire, supplied at a potential of 110 volts on a 60 cycle alternating current; a rotor disk of hardened tool steel .494 inches diameter, .040 inch thick will start from rest and run synchronously with much more than sufficient power to drive an ordinary office clock.

A rotor of the same diameter but only .008" thick in the same field, will run almost synchronously but will slip slowly, doubtless owing to the greater concentration of magnetic flux through the rotor which is consequently unable to maintain its own polarity in passing through portions of its zone where the flux distribution is irregular.

The rotor first mentioned which is .040" in thickness will not be able to maintain synchronism in the same field if the strength of magnetizing current is increased materially because then the density of the magnetic flux in combination with the somewhat irregular distribution of this flux will prevent the rotor from maintaining the fixed position of its poles. The effect of increasing the diameter of the rotor without changing its thickness is obviously to reduce the air-gap around the rotor, thus bringing its edge nearer to the pole faces where the flux distribution is locally very irregular, and such an increase of the diameter of the rotor will speedily result in preventing it from maintaining synchronism.

The effect of weakening the magnetic field in which the rotor is revolving, will not throw it out of synchronism until the power output is less than the load. The effect of increasing the thickness of the rotor in the same field to as much as $\tfrac{1}{4}''$ for instance, results in nullification of its synchronous operation. This may be due in part to the great increase in inertia of the rotor and also to the presence of Foucault currents in the mass of the rotor which tend to prevent magnetic flux from passing through freely and probably prevent any considerable degree of initial permanent magnetization.

So also the proportions and relations of the rotor and the magnet may be varied so that a rotor which will not run synchronously in a rotating magnetic field produced by an alternating current of a given frequency, will run synchronously in a magnetic field produced by an alternating current of a different frequency.

To illustrate: I have above stated certain proportions of the rotor, magnet, and current to produce a self-starting rotor which will run synchronously, to wit: a rotor .494″ in diameter and .040″ thick which will start and run synchronously in a rotating magnetic field produced by an alternating current whose frequency is 60, at 110 volts, and that a rotor of the same diameter but only .008″ thick will slip slowly, whereas such slipping of the rotor can be counteracted by weakening the strength of the field by means of a reduction in the voltage supplied across the terminals of the 4800 turn magnetizing coil, and I have demonstrated that the rotor .008″ thick will run synchronously when the voltage is reduced to about 40 volts by reason of the corresponding reduction in the strength of the field.

It will therefore be seen that the proportions and relations of the parts of the rotor, magnet and current may be varied in one or more directions so as to convert a motor having a rotor which is self-starting by reason of the magnetic remanence therein but which will not run synchronously, into a motor whose rotor is self-starting and will run synchronously, and consequently I do not desire to limit the invention to the particular proportions of the rotor, magnet and strength of rotating field herein set forth.

A self-starting synchronous motor such as above described, has a wide field of usefulness and is especially adapted among other uses for driving a clock mechanism after the manner illustrated in another application Serial Number 115955 filed by me August 21, 1916, and in the present instance the rotor shaft 31 is shown as provided with a worm 33 located in the casing 34. Special attention is called to the following great advantages of this motor for operating timing devices. The rotor is extremely small and light, therefore its fly wheel effect is extraordinarily slight and consequently it will go from rest to synchronous speed when the current is turned on and will stop when the current is turned off almost instantaneously. The rapidity in stopping after the current has been turned off is greatly increased, because the rotor having become permanently magnetized reacts strongly upon the surrounding iron in the field and also the rotor shaft drops and rubs at its lower end. Consequently, when used to drive a clock, any interruption in current supply produces a corresponding definite stoppage of the hands for substantially the same number of seconds which can be exactly compensated for by an auxiliary driving mechanism with no-voltage release as described in my application Serial Number 150876 filed February 26, 1917.

If an ordinary synchronous motor were used for this purpose that had any considerable fly wheel effect in its rotor, even if it were self-starting, the time required to reach synchronism after the current began to flow and more particularly the time required to come to rest after an interruption of the current would be so great and indeterminate that it could not be accurately compensated for by an auxiliary driving mechanism.

The motor described is bipolar but obviously would operate properly with any multiple of two poles.

I have herein shown and described one construction of self-starting synchronous motor, which may be preferred by me, but it is not desired to limit the invention to the particular construction shown.

The present application is a continuation in part of application Serial Number 134260 filed December 1, 1916, as a division of application Serial Number 115955 filed August 21, 1916.

Claims:

1. A self-starting synchronous motor for alternating current, consisting of means for producing a rotating magnetic field and a rotor located therein, said rotor and said means being arranged and proportioned to enable the rotor to start from rest by reason of magnetic remanence therein and also to run synchronously.

2. A self-starting synchronous motor for alternating current, comprising means for producing an elliptic rotating magnetic field and a substantially geographical non-polar rotor located therein, said rotor and said means being constructed and proportioned to coöperate to enable the rotor to start from rest by reason of magnetic remanence therein, and also to nullify progressive shifting of the rotor magnetism when the rotor is rotating synchronously.

3. A self-starting synchronous motor for alternating current, comprising a stator having means for producing an elliptic rotating magnetic field, and a rotor whose tendency to start from rest due to magnetic remanence is greater than the tendency to seek a position of rest where the magnetic reluctance across a diameter is least, said rotor being so proportioned with respect to said magnetic field as to run synchronously without slipping of the rotor magnetism.

4. A self-starting synchronous motor for alternating current, consisting of a rotor composed of a thin substantially circular disk of hardened steel whose magnetic poles have a tendency to shift progressively, and a magnet provided with means for producing a rotating magnetic field in which said rotor is located and having poles whose opposing ends are separated from each other by substantially narrow spaces and whose curved faces substantially encircle the said rotor and are separated from the latter by a substantially wide air gap, and which coöperate with said rotor to enable the rotor to start from rest by reason of magnetic remanence therein and also to nullify progressive shifting of the rotor magnetism when the rotor is rotating synchronously.

5. A self-starting synchronous motor for alternating current, consisting of a rotor possessing remanent magnetism and whose tendency to remain at rest is less than the tendency to rotate, and a magnet for producing a rotating magnetic field in which said rotor is located, said rotor and said magnet being arranged and proportioned with respect to each other so as to enable the rotor to start from rest by reason of the magnetic remanence therein and to offset the tendency of the remanent magnetism to be shifted by the rotating magnetic field when the rotor is running synchronously.

6. A self-starting synchronous motor for alternating current, consisting of a rotor possessing magnetic remanence and having a substantially uniform reluctance to the passage of magnetic lines of force in all positions of the rotor, and means for producing a rotating magnetic field of definite strength and frequency in which said rotor is located, said rotor and said means being arranged and proportioned with relation to each other to enable the rotor to start from rest by reason of the magnetic remanence therein and to run synchronously.

In testimony whereof, I have signed my name to this specification.

HENRY E. WARREN.